(12) United States Patent
Collin et al.

(10) Patent No.: US 10,330,468 B2
(45) Date of Patent: Jun. 25, 2019

(54) DIGITAL CIRCUITRY AND METHOD FOR CALCULATING INCLINOMETER ANGLES

(71) Applicant: MURATA MANUFACTURING CO., LTD., Nagaokakyo-shi, Kyoto (JP)

(72) Inventors: Rauli Collin, Pirkkala (FI); Antti Finne, Vantaa (FI)

(73) Assignee: MURATA MANUFACTURING CO., LTD., Nagaokakyo-Shi, Kyoto (JP)

(*) Notice: Subject to any disclaimer, the term of this patent is extended or adjusted under 35 U.S.C. 154(b) by 359 days.

(21) Appl. No.: 15/180,236

(22) Filed: Jun. 13, 2016

(65) Prior Publication Data
US 2016/0377427 A1 Dec. 29, 2016

(30) Foreign Application Priority Data
Jun. 24, 2015 (FI) ...................................... 20155492

(51) Int. Cl.
*G01C 9/02* (2006.01)
*G01C 9/00* (2006.01)
(Continued)

(52) U.S. Cl.
CPC ................ *G01C 9/02* (2013.01); *G01C 9/00* (2013.01); *G01P 15/08* (2013.01); *G06F 7/4818* (2013.01)

(58) Field of Classification Search
USPC ...................................................... 702/151
See application file for complete search history.

(56) References Cited

U.S. PATENT DOCUMENTS 3,766,370 A * 10/1973 Walther ................ G06F 7/5446
708/230
4,945,505 A * 7/1990 Wiener ................. G06F 7/4818
708/204
(Continued)

FOREIGN PATENT DOCUMENTS

| CN | 103677738 A | 3/2014 |
|---|---|---|
| TW | 358759 B | 5/1999 |
| TW | 200805342 A | 1/2008 |
| TW | 201107708 A | 3/2011 |

OTHER PUBLICATIONS

Boudabous, A., Ghozzi, F., Kharrat, M., Masmoudi, N. Implementation of Hyperbolic Functions Using CORDIC Algorithm. IEEE Xplore [online], May 2005 [retrieved on Jul. 20, 2018]. Retrieved from the Internet: <URL: https://ieeexplore.ieee.org/document/1434772/>.*

(Continued)

*Primary Examiner* — Paul D Lee
(74) *Attorney, Agent, or Firm* — Squire Patton Boggs (US) LLP

(57) ABSTRACT

A method is disclosed for performing calculations for an inclinometer device, as is a digital circuitry for performing such calculations. The circuitry comprises an interface for receiving detection signals from a sensor device and a CORDIC unit for performing calculation of inclinometer output values characterizing a resultant vector. The CORDIC calculation unit is configured to perform a calculation for resolving the angle between a resultant vector and a programmable reference value using hyperbolic CORDIC calculation. Pre-rotation may be performed for a vector before hyperbolic CORDIC arctangent calculation phases.

18 Claims, 8 Drawing Sheets

(51) Int. Cl.
*G06F 7/48* (2006.01)
*G01P 15/08* (2006.01)

(56) References Cited

U.S. PATENT DOCUMENTS

| | | |
|---|---|---|
| 6,385,632 B1 | 5/2002 | Choe et al. |
| 7,606,852 B2 | 10/2009 | Maharatna et al. |
| 2005/0278137 A1* | 12/2005 | Hammerschmidt ... G01B 21/22 702/151 |
| 2012/0109574 A1 | 5/2012 | Manolescu |
| 2014/0278075 A1* | 9/2014 | Fink ........................ G01C 21/00 701/468 |

OTHER PUBLICATIONS

Mazenc C., Merrheim X., Muller J., "Computing Functions cos-1 and sin-1 Using Cordic" in IEEE Transactions on Computers, vol. 42, No. 1, Jan. 1993, pp. 118-122.

Wei-Ting Liao, et al., "Precision Enhancement and Performance Evaluation of a CORDIC-Based Tilting Angle Identification Algorithm for Three-Axis Accelerometers", 2013 International Symposium on Biometrics and Security Technologies, pp. 187-192.

Pongyupinpanich Surapong et al., "Design and Analysis of Extension-Rotation CORDIC Algorithms Based on Non-Redundant Method", International Journal of Signal Processing, Image Processing and Pattern Recognition vol. 5, No. 1, Mar. 2012, pp. 65-84.

International Search Report application No. PCT/IB2016/053647 dated Sep. 22, 2016.

Finnish Search Report dated Jan. 19, 2016 corresponding to Finnish Patent Application No. 20155492.

E. Laulainen et al., "Compass tilt compensation algorithm using CORDIC," IEEE International Symposium on Circuits and Systems, 2008 (ISCAS 2008), edited by Lei Yan et al, pp. 1188-1191.

Taiwanese Search Report application No. 105119541 dated Jan. 7, 2017.

\* cited by examiner

DIGITAL CIRCUITRY AND METHOD FOR CALCULATING INCLINOMETER ANGLES

BACKGROUND

Field

The present invention relates to a digital circuitry for performing calculations for an inclinometer device. The present invention further relates to a method for performing calculations for an inclinometer device.

Description of the Related Art

An accelerometer is a device that measures proper acceleration, a.k.a the g-force. Proper acceleration is the physical acceleration experienced by an object, and it is measured relative to an inertial observer (an inertial frame), who is momentarily at rest relative to the object being measured. For example, an accelerometer at rest relative to Earth's surface will indicate about 1 g acceleration upwards. In order to obtain the acceleration due to motion with respect to the Earth, gravity offset shall be subtracted from the readings, and corrections are needed for effects caused by the Earth's rotation relative to the inertial frame. A multi-axis accelerometer detects magnitude and direction of the proper acceleration as a vector quantity, and it may be used to sense for example orientation, coordinate acceleration, vibration, shock and falling in a resistive medium.

FIG. 1 illustrates basic concept of an accelerometer, which may be explained with a damped proof mass M anchored to a fixed frame with a spring K. Damper D reduces or restricts oscillation of the system. When the accelerometer experiences acceleration, the proof mass M is displaced until the spring causes an opposite force on the proof mass large enough that the proof mass starts moving at the same rate as the accelerometer device. The displacement is then measured to give the acceleration. External acceleration of this kind of a system may be described with the equation:

$$H(s) = \frac{x(s)}{a(s)} = \frac{1}{s^2 + \frac{D}{M}s + \frac{K}{M}}$$

where a is the external acceleration, x is the proof mass displacement, M is the mass of the proof mass, D is the damping factor of the damper and K is the spring constant. H represents sensitivity of the accelerometer, i.e. the amount of displacement x caused by given amount of acceleration a.

FIG. 2 illustrates a one dimensional example of a simple microelectromechanical (MEMS) accelerometer. It may be presented with a simple structure comprising a cantilever beam (102) acting as a spring and a proof mass (101). The beam (102) and the proof mass (101) are placed in an enclosure (103) which may further contain damping gas. Under influence of external acceleration, the proof mass (101) deflects from its neutral position. This deflection is then measured electrically. Measurement of the deflection may be capacitive, based for example on change of capacitance between at least one fixed electrode and at least one electrode attached to the moving proof mass (101). As known by a person familiar with the art, capacitance between two electrodes will change if the distance or the overlapping area between the two electrodes changes. In FIG. 2, we may see an example with two pairs of capacitive electrodes (105) for detecting the deflection of the proof mass (101). Alternatively, piezoelectric detection may be implemented in the spring(s) (102) attached to the proof mass (101), detecting deformation of the spring(s) (102). Damping may be arranged for the accelerometer proof mass by placing the proof mass (101) inside a chamber (103) within the accelerometer device that contains damping gas.

An inclinometer is an instrument for measuring angles of slope, elevation or depression of an object with respect to gravity. An accelerometer, such as a MEMS accelerometer, may be used as a sensor for an inclinometer, when suitable calculation is provided for converting the detected acceleration values into angle values. The axes of measurement of an inclinometer are typically, but not necessarily, orthogonal.

A tilt sensor or a tilt meter is an instrument measuring tilt, often with respect to a plane defined by two axes. A typical tiltmeter is designed for measuring changes from the vertical level. Full motion tilt sensor may use at least three axes. An accelerometer capable of measuring acceleration may be used as a sensor for a tiltmeter, when suitable calculation is provided for converting the detected acceleration values into resultant vector angle values. An accelerometer may measure tilt with respect to one, two or three axes. The axes of measurement of a tiltmeter are typically, but not necessarily, orthogonal.

We will use single term inclinometer for any device capable of measuring inclination or tilt.

CORDIC (Coordinate Rotation Digital Computer) is a technique developed and originally published in 1959. The computing technique was designed to be implemented on real-time navigational systems where trigonometric computing relationships were to be calculated quickly and efficiently, using only simple bit shifting and summing operations. Bit shifting operation means that the most significant bit(s) (MSB(s)) retain(s) its value, while the values of the other bits are shifted for a defined amount either towards the least significant bit(s) (LSB(s)) or towards the most significant bit(s) (MSB(s)), depending on the calculation operation to be performed, as known by a person familiar with the art. In a bit rotation operation, the most significant bit(s) become replaced by the least significant bit(s). CORDIC calculation is one possible method for calculating inclinometer or tilt meter angle information out of an accelerometer device. Since its inception, the CORDIC algorithm has been further developed for calculation of for instance Discrete Fourier Transforms, exponential, logarithmic functions and forward and inverse circular and hyperbolic functions, ratios and square roots. A benefit of CORDIC is that the operations can be implemented with bit shift operations only, without division or multiplication, which would require more calculation resources. Thus, CORDIC solutions are effective even in modern Application Specific Integrated Circuit (ASIC) implementations, enabling effective calculation with fairly simple circuitry and small chip area, without need for an expensive processor device for the calculation task. Alternatively, a CORDIC unit may be implemented with a Field Programmable Gate Array (FPGA), for instance. While a CORDIC unit implementation is lightweight and small in size, it is well applicable for real-time calculation for instance in MEMS inclinometers, tiltmeters and/or tilt sensors, but also in various wireless applications.

FIG. 3 illustrates calculation of arctangent function, which is a traditional use of the CORDIC method. This can be illustrated as rotating a position vector in a two dimensional plane. The position vector, also called as the location vector or as the radius vector, always starts from the defined origin, and the end of the position vector, simply called as the position, pointing a position within the plane, moves within the set plane. CORDIC method is based on rotating the position vector in a set plane, as here in the exemplary xy-plane towards the positive x-axis. The step of rotation is made smaller each time, so that the result is approaching the wanted value. The amount of rotation has been selected so that next position in the xy-plane may be calculated by using complex multiplication operation on the previous position, without using actual multiplication operation:

$$x_{i+1} = x_i \pm 2^{-i} \cdot y_i$$

$$y_{i+1} = y_i \mp 2^{-i} \cdot x_i$$

$$\theta_{i+1} = \theta_i \pm \theta_{i\_ROM}$$

With each iteration round (i=0, 1, 2 . . . ) the value of x approaches value $K_C \sqrt{x^2+y^2}$ and resultant angle θ approaches value arctan(x/y). As shown by the equation, the resultant angle θ is received from the sum of the values of the elementary angles of each iteration round ($\theta = \Sigma_{i=0}^n \theta_{i\_ROM}$). The elementary angle value ($\theta_{i\_ROM}$) to be summed at each iteration to the current intermediate resultant angle ($\theta_i$), corresponding to the current sum of previous elementary angle values ($\theta_{i\_ROM}$), is received from a value table. The direction of the next turn, and thus then the sign used for summing (i.e. adding or subtracting) the next elementary angle value ($\theta_{i\_ROM}$) is decided based on the sign of the previous position. When a vector coordinate system, as in the examples that will be described below, using (x,y)-coordinates is applied, the decision is made based on the sign of y-coordinate: if previous position is below the positive x-axis (y value is negative), the next turn will be upwards and the next elementary angle value ($\theta_{i\_ROM}$) will be added (+), and if previous position is above the positive x-axis (y value is positive), the next turn will be downwards, the sign will be negative and the next elementary angle value ($\theta_{i\_ROM}$) will be subtracted (−). Alternatively, rotation mode may be used, using axis angle coordinates (r,θ), the decision is made based on the sign of the current resultant angle ($\theta_i$): when the current intermediate resultant angle ($\theta_i$) is negative, next elementary angle ($\theta_{i\_ROM}$) will be added, and if the current intermediate resultant angle ($\theta_i$) is positive, next elementary angle ($\theta_{i\_ROM}$) will be subtracted. The more iteration rounds are performed, the more accurate the result will be, since the size of the elementary angles ($\theta_{i\_ROM}$) get smaller at each iteration. Rotating the position vector as described above will always increase the length of the resultant vector by multiplier $$K_c = \prod_{i=0}^n \frac{1}{\sqrt{(1+2^{-2i})}} \approx 1.646, n \to \infty$$

This is not a problem, however, since all comparisons are made against zero y value, and only the sign of the current position vector in y-axis direction (y value) matters in comparisons.

FIG. 4 illustrates traditional calculation of arcsine function with CORDIC method. A common way to solve arcsine with CORDIC is to start turning the position vector from the positive x-axis, and to set the target level as a line aligned with the x-axis, which corresponds to a set y value. Decision on direction of next rotation and thus the sign of the next summing operation (adding or subtracting) is made based on comparing the y-coordinate of the result position vector end point with this target level value. The length of the position vector however grows as described in connection with arctangent function. This causes errors in the traditional arcsine calculation due to false decisions made for the direction of the following rotations. This is a well-known problem and one common method to avoid this is a so called double iteration and shifting of the set target level on each rotation. Another known method to solve this problem is scaling the position vector length on each rotation; this requires, however, a multiplication operation, which consumes calculation resources. Both double iteration and target level shifting and scaling the position vector length require adding ports and thus increasing the physical size of the CORDIC unit, increase the time required for calculation and still cause error in the result.

US patent publication US20120109574 presents a Multi-Dimensional Vector Determining Circuit comprising a sensor device and a CORDIC circuit. This sensor device refers to traditional methods for calculating arctangent function with CORDIC as described in U.S. Pat. Nos. 6,385,632 and 7,606,852, and the application remains silent about known problems causing errors in CORDIC calculations. None of these documents discusses the problem of errors occurring in known methods of arcsine calculation.

A solution is needed which is capable of producing reliable high accuracy CORDIC calculation results for inclinometer or angle calculation use without significantly increasing the size of the CORDIC unit circuitry.

SUMMARY

An object of the present invention is to provide a method and apparatus so as to overcome the prior art disadvantages.

A resultant vector is a position vector calculated as a sum of component vectors. It can be described as a directed line segment from the origin of the Euclidean space to a point in that space. Length of the resultant vector may be considered as a Euclidean norm (Euclidean length) of given component vectors. These component vectors may be obtained by a sensor device sensing vectors along multiple sensing axes. The term resultant vector may present the entire resultant vector calculated based on all available component vectors, or a projection of the resultant vector on a plane or compared to a set reference, depending on the current calculation mode Embodiments of the present invention are based on the idea of combining at least three different modes of CORDIC calculation in a single CORDIC calculation unit in order to provide inclination calculation results in three different Cartesian coordinate systems. One of the CORDIC calculation modes utilizes hyperbolic CORDIC calculation for resolving an angle between a reference value and a resultant vector, while other modes may utilize traditional circular CORDIC method.

According to a first aspect, a digital circuitry for performing calculations for an inclinometer device is provided, the circuitry comprising an interface for receiving detection signals from a sensor device and a CORDIC unit for performing calculation of inclinometer output values characterizing a resultant vector. The CORDIC calculation unit is configured to perform a first calculation for resolving an angle between a resultant vector and a programmable reference value the first calculation including at least two hyperbolic CORDIC calculation phases.

According to a second aspect, the programmable reference value corresponds to an effect of normal gravity along a defined reference axis.

According to a third aspect, the first calculation can include determining a first intermediate result corresponding to a length of a projection of the resultant vector on the reference axis times a multiplier representing the change of the length of the vector by using a hyperbolic CORDIC arctangent function. A second intermediate result is determined, corresponding to a length of a component of the resultant vector orthogonal with a reference axis multiplied with a multiplier representing a change of the length of the vector using a hyperbolic CORDIC arctangent function. An angle between the resultant vector and a calculated axis orthogonal to the reference axis is determined based on the first and the second intermediate results using a circular CORDIC arctangent function.

According to a fourth aspect, the result of the first calculation equals to an angle calculated with arcsine function between the resultant vector and the reference value, and the circuitry is configured to perform at least one pre-rotation prior to performing any one of the hyperbolic CORDIC arctangent calculations in order to expand a convergence condition of the resulting arcsine function.

According to a fifth aspect, the CORDIC calculation unit is further configured to perform at least one of a second calculation for resolving an angle between a resultant vector or a projection of the resultant vector and an axis in a plane defined by two axes, the second calculation including one circular CORDIC calculation phase, a third calculation for resolving an angle between a resultant vector and a plane defined by two detection axes, the first calculation utilizing at least two circular CORDIC calculation phases, and a fourth calculation for resolving a length of the resultant vector, the fourth calculation including at least two circular CORDIC calculation phases.

According to a sixth aspect, each of the CORDIC calculations is configured to make a decision on a sign of a subsequent summing operation by comparing value of a current resultant vector to a zero value.

According to a seventh aspect, each CORDIC calculation is configured to perform two bit shifting operations per CORDIC iteration round.

According to an eighth aspect, the detection signals comprise signals corresponding to acceleration detected along three mutually orthogonal axes, and the CORDIC calculation unit is configured to perform similar calculations using detection signals of any one, two or three of the three axes.

According to a ninth aspect, the digital circuitry further comprises an Arithmetic Logic Unit (ALU) configured to correct sensitivity, offset and rotation of the detection signals, in order to provide corrected detection signals as input for the CORDIC unit.

According to a tenth aspect, the sensor device comprises a MEMS accelerometer.

According to a first method aspect, a method for performing calculations for an inclinometer device is presented. The method is performed based on detection signals received from a sensor device and the method comprising calculations of inclinometer output values characterizing a resultant vector, the calculations being performed by a CORDIC unit. The method comprises performing a first calculation for resolving an angle between a resultant vector and a programmable reference value, the first calculation including at least two hyperbolic CORDIC calculation phases.

According to a second method aspect, the programmable reference value corresponds to effect of normal gravity along a defined reference axis.

According to a third method aspect, performing the first calculation can include determining a first intermediate result corresponding to a length of a projection of the vector on the reference axis times a multiplier representing the change of the length of the vector by using a hyperbolic CORDIC arctangent function. A second intermediate result is determined, corresponding to a length of the component of the vector orthogonal with the reference axis multiplied with the multiplier representing the change of the length of the vector using a hyperbolic CORDIC arctangent function. An angle between the resultant vector and the calculated axis orthogonal to the reference axis is determined, based on the first and the second intermediate results using a circular CORDIC arctangent function.

According to a fourth method aspect, the result of the first calculation equals to an angle calculated with an arcsine function between the resultant vector and the programmable reference value, and prior to performing any one of the hyperbolic CORDIC arctangent calculations. The method further comprises performing at least one pre-rotation for the resultant vector in order to expand a convergence condition of the resulting arcsine function.

According to a fifth method aspect, the method further comprises any one of performing a second calculation for resolving an angle between a resultant vector or a projection of the resultant vector and an axis in a plane defined by two axes, the second calculation including one circular CORDIC calculation phase, performing a third calculation for resolving an angle between a resultant vector and a plane defined by two detection axes, the first calculation utilizing at least two circular CORDIC calculation phases, and performing a fourth calculation for resolving the length of the resultant vector, the fourth calculation including at least two circular CORDIC calculation phases.

According to a sixth method aspect, each of the CORDIC calculations is configured to make a decision on a sign of a subsequent summing operation by comparing a value of a current resultant vector to a zero value.

According to a seventh method aspect, each of the CORDIC calculations is configured to perform two bit shifting operations per CORDIC iteration round.

According to an eighth method aspect, the detection signals comprise signals corresponding to acceleration detected along three mutually orthogonal axes, and the CORDIC calculation unit is configured to perform similar calculations using detection signals of any one, two or three of the three axes.

According to a ninth method aspect, the method further comprises steps of correcting sensitivity, offset and rotation of the detection signals, the steps of correcting performed by an Arithmetic Logic Unit (ALU), in order to provide corrected detection signals as input for the CORDIC unit.

According to a tenth method aspect, the sensor device comprises a MEMS accelerometer.

The present invention has the advantage that it enables using a single CORDIC unit for calculation of up to nine different resultant vector angle values using one, two or three different acceleration value inputs. An improved CORDIC unit is capable of calculating both arctangent and arcsine functions with the same circuitry without significantly increasing the size of the circuitry from a simple circular CORDIC unit design. Characteristic to a CORDIC unit, no division or multiplication operations are needed, but all calculations are implemented with simple and effective bit shifting and summing operations. All needed comparison operations may be implemented by simply comparing signs (i.e. comparing value with zero value) so that no actual value comparison operations are needed. The invented method to implement arcsine operation avoids use of double iteration that has been needed to correct wrong iterations occurring once in a while for instance in arccosine, arcsine operations in known prior art solutions. An example of a prior art solution with double iteration is described for instance in Mazenc C, Merrheim X., Muller J.: "Computing Functions cos-1 and sin-1 Using Cordic" in IEEE Transactions on Computers, Vol. 42, No. 1, January 1993 pp. 118-122. Also need for level shift operations for arcsine calculation is avoided, and each CORDIC iteration may be implemented with no more than two angle rotation operations. In addition to calculation of multiple resultant vector angle values, the invented CORDIC unit is capable of calculating the length of the resultant vector with high accuracy. Calculation of the length of the resultant vector is implemented with a short and quick operation, and with minimum logic overhead.

BRIEF DESCRIPTION OF THE DRAWINGS

In the following the invention will be described in greater detail, in connection with preferred embodiments, with reference to the attached drawings, in which.

DETAILED DESCRIPTION

Depending on the design, an accelerometer may provide measurement values representing acceleration in one to three dimensions. The measurement values obtained by the accelerometer in x-, y- and/or z-dimensions define an initial position vector. CORDIC method may be used to define the length and an angle θ for this position vector, or any resultant vector formed based on one or more of these measurement values.

Figure 5:
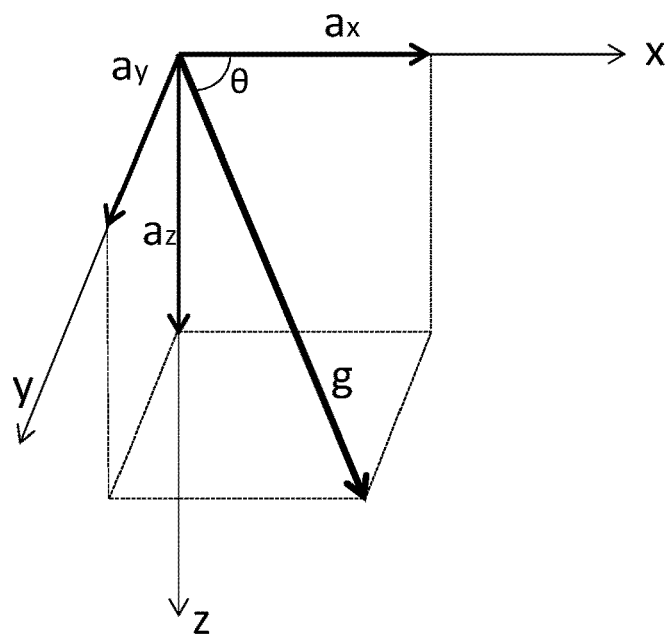
FIG. 5 illustrates calculation of an angle in three axis mode

The FIG. 5 illustrates calculation of an angle θ, corresponding to the direction of resultant vector g with respect to the detected acceleration of three components $a_x$, $a_y$ and $a_z$ in direction of the set coordinate axes x, y and z respectively. The algorithm calculates the angle with operation:

$$\theta = \arctan\frac{x}{\sqrt{y^2 + z^2}}$$

where terms x, y and z correspond to the detected values of $a_x$, $a_y$ and $a_z$ respectively. Similar notation will be used throughout the description in order to simplify the equations.

Figure 6:
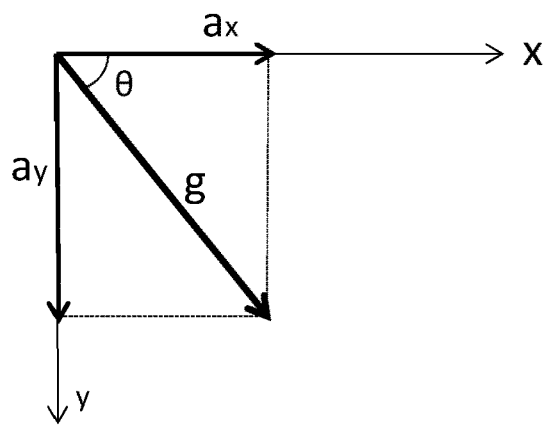
FIG. 6 illustrates calculation of an angle in two axis mode.

FIG. 6 illustrates calculation of an angle θ, corresponding to the direction of acceleration g when two components of acceleration have been measured, or two components of acceleration are used for calculating the angle θ. When using this calculation mode, it is assumed that the third axis is in 90° angle (i.e. orthogonal) to the detected resultant vector g. Now the angle θ is calculated by the algorithm with equation:

$$\theta = \arctan\frac{x}{y}$$

If the resultant vector g would not be exactly in the xy-plane, this mode will calculate the angle θ for a projection of the resultant vector g in the xy-plane. In addition to the exemplary xy-plane, similar calculation may be performed in yz-plane or in xz-plane, when replacing x and y with y and z or x and z respectively.

Figure 7:
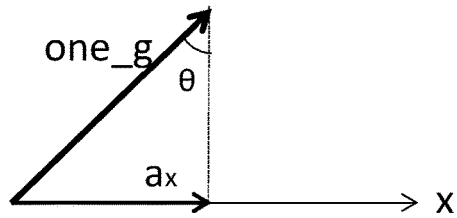
FIG. 7 illustrates angle calculation in single axis mode.

FIG. 7 illustrates angle calculation in single axis mode. Now, the angle of each axis is calculated with respect to a reference vector (one_g) corresponding to effect of normal gravitation on a device otherwise in rest. Such reference vector may also be called as a reference gravitation vector. In this case it is assumed that each axis has been calibrated so that the 1 g value (one_g) is known for each axis. The reference vector, or the reference values corresponding to the reference vector can be programmable, so that other reference vector can be chosen to fine tune the device instead of the exemplary one_g gravitation reference vector. The term programmable indicates that although the reference vector is preferably defined during calibration of the device, the reference vector may even be made programmable by a user of the sensor device. However, the latter is an optional feature, and defining the reference vector by the manufacturer for instance during calibration of the device shall be considered fulfilling the programmability characteristic. Then the angle θ between each individual axis and the exemplary one_g reference vector may be calculated like:

$$\theta = \arcsin\frac{x}{one\_g}$$

When calculating angle of y or z, x in the above equation will be replaced with the respective value of y or z, and the one_g reference value will be selected accordingly for the respective axis. Similar calculation may be performed for any selected reference vector by replacing the one_g reference value.

In addition to the three modes for calculating angle θ, length of the resultant vector g may be calculated for any and each of the three modes with equation:

$$\text{length}(g) = \sqrt{x^2 + y^2 + z^2}$$

Calculated length of the resultant vector (length(g)) may further be compared to a reference value, such as length of the selected reference vector (i.e. one_g).

Figure 1:
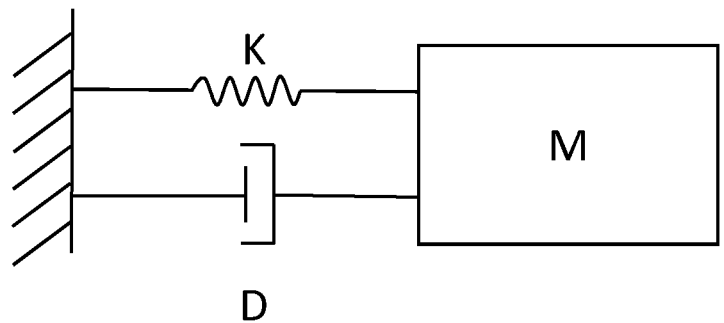
FIG. 1 illustrates basic concept of an accelerometer.
Figure 2:
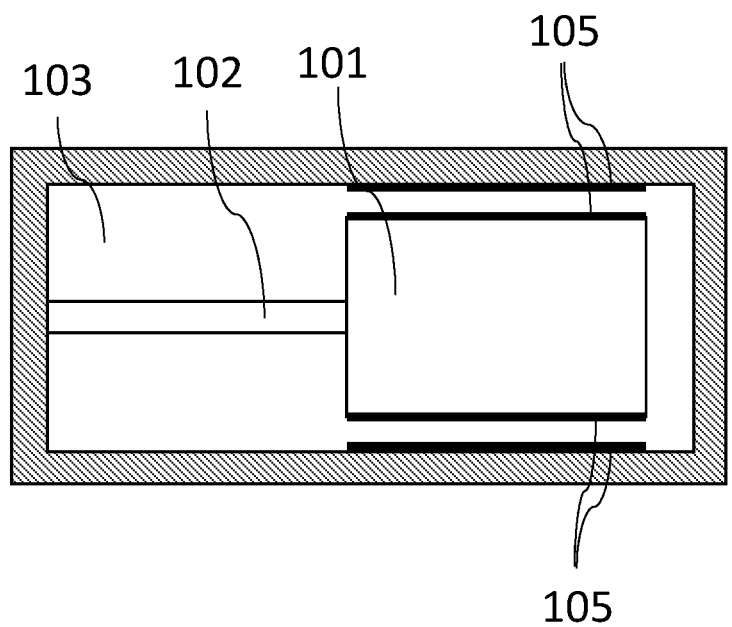
FIG. 2 illustrates a one dimensional example of a simple microelectromechanical (MEMS) accelerometer.
Figure 3:
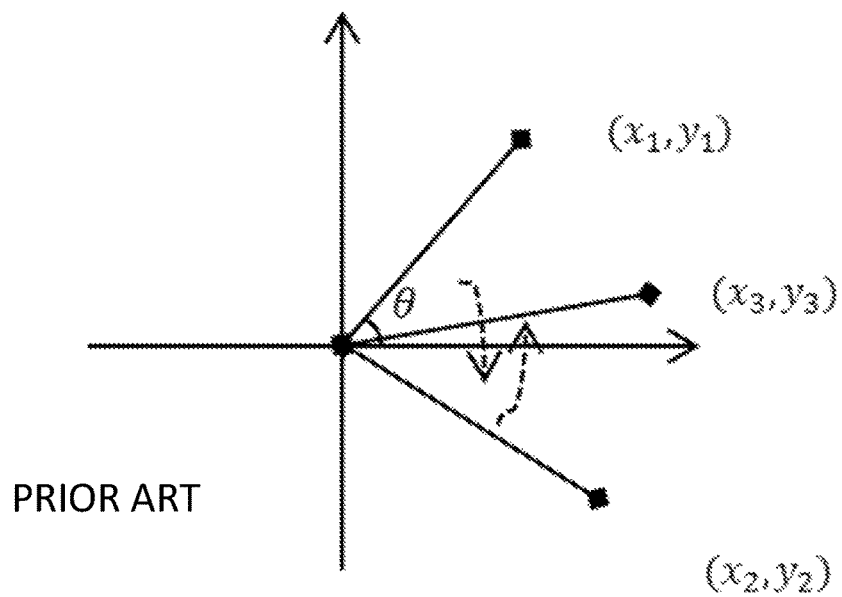
FIG. 3 illustrates calculation of arctangent function with CORDIC method.
Figure 4:
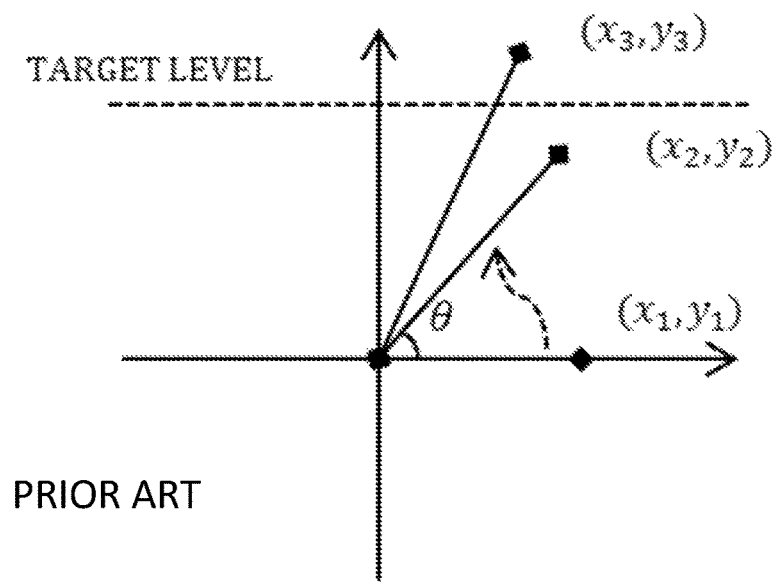
FIG. 4 illustrates traditional calculation of arcsine function with CORDIC method.

The traditional methods of using CORDIC for calculating angle θ and length of a resultant vector (a position vector) was explained earlier in relation to FIGS. 2 and 3. An improved method to calculate the arcsine used at least in the single axis mode will be described next, avoiding the problems caused by double iteration, target level shifting and scaling the resultant vector length needed traditionally for arcsine calculation with CORDIC. In the improved method, the arcsine function is calculated by utilizing hyperbolic functions, which may be calculated with CORDIC method with equations:

$$x_{i+1}=x_i \pm 2^{-i} \cdot y_i$$

$$y_{i+1}=y_i \pm 2^{-i} \cdot x_i$$

$$\theta_{i+1}=\theta_i \pm \theta_{i\_ROMH}$$

where i=1, 2, 3 . . . , n. Rotating the x and y values is always made in mutually same direction, whereas in calculation of arctangent function direction of rotation would vary. Using this hyperbolic method for performing arcsine calculation allows comparison of the current value with zero value, in other words a sign detection operation. These comparisons are made for the intermediate results of the respective accumulators (118, 120 in FIG. 11). By enabling use of such relatively simple comparison operation without any need for level shifting risk of errors in the decisions is reduced in comparison with traditional arcsine calculation. Value of x approaches value $K_H \sqrt{(x^2-y^2)}$ and resultant angle $\theta$ approaches value arctanh(x/y). When calculating hyperbolic functions, the resultant vector length gets shorter with each iteration by multiplier $$\Pi_{i=0}^{n}\sqrt{(1-2^{-2i})} \approx 0.8281, n \to \infty$$

Condition for convergence of hyperbolic series causes a requirement that rotations i=4, 13, 40 . . . need to be made twice. In addition, hyperbolic tangent function has a convergence condition value ≲1.1182, which corresponds to an angle limit of approximately 64.07°. In other words, a CORDIC unit utilizing an uncorrected hyperbolic tangent function will only be able to calculate angles that are less than 64.07°. This limitation may be circumvented by performing one or more so called pre-rotations. For example, two pre-rotations may be performed for the resultant vector before starting the actual hyperbolic CORDIC method (i=−1, 0):

$$x_{i+1}=x_i \pm (1-2^{i-2}) \cdot y_i$$

$$y_{i+1}=y_i \pm (1-2^{i-2}) \cdot x_i$$

These pre-rotations may be performed with the same circuitry that performs the hyperbolic functions, if the expressions in parenthesis are opened in order to generate separate rotations (i=3, 2):

$$(1-2^{i-2}) \cdot x_i = x_i - 2^{-i} x_i$$

$$(1-2^{i-2}) \cdot y_i = y_i - 2^{-i} y_i$$

With the exemplary two pre-rotations, the convergence condition of the resulting arcsine calculation expands up to approximately 88.5°, which is sufficient for the inclinometer application. Convergence condition of the calculation refers to the capability of the calculation to converge to a defined result, wherein the angle indicates the maximum resultant angle that may be calculated with acceptable accuracy. For the hyperbolic tangent function, increasing the number of pre-rotations brings the convergence condition closer to 90°. Arcsine function is solved by using the hyperbolic tangent function first to solve the length of the unknown edge of the triangle with Pythagorean method $\sqrt{one\_g^2-x^2}$, and then using this result for solving the respective resultant angle ($\theta$) with traditional circular CORDIC arctangent operation:

$$\theta = \arctan \frac{x}{\sqrt{one\_g^2 - x^2}}$$

During the hyperbolic operation, the amount of bit shifting in the bit shifting operation as specified for hyperbolic operation may be obtained from a static table. Such static table may be for instance stored in a Read Only Memory (ROM). In traditional hyperbolic CORDIC operations amount of shifting is obtained directly from the number of the iteration. As an alternative for using a static table, a counter may be used that has been configured to repeat certain values according to the known sequence.

Calculating the length of the resultant vector utilizes capability of arctangent operation, where x approaches value $K_C \sqrt{x^2+y^2}$. In order to calculate the length of the resultant vector in a three axis coordinate system, the calculation of the root expression is divided into three phases:

$$l_1 = K_C\sqrt{x^2+y^2}$$

$$l_2 = K_C z$$

$$l_3 = K_C\sqrt{l_1^2+l_2^2} = K_C^2 \sqrt{x^2+y^2+z^2}$$

In order to remove multiplier $K_C^2$, a division is performed using a linear CORDIC operation defined by:

$$x_{i+1}=x_i$$

$$y_{i+1}=y_i \pm 2^{-i} \cdot x_i$$

$$\theta_{i+1}=\theta_i \pm 2^{-i} \cdot d_i$$

Now the angle $\theta_i$ approaches value $d_0 \cdot y_0/x_0$. By placing a constant value $K_C^2$ scaled with a suitable power of two as divisor $x_0$, and using the selected reference value as the initial value for the angle $d_0$, the resultant vector length will be received directly in relation to the selected reference vector length. As the linear CORDIC calculation does not need an x-accumulator or a shifter, it is used as an accumulator for angle value and/or as a shifter in the operation mode for calculating the length of the resultant vector. A power of two may be selected for scaling factor in order to avoid the last multiplication. The output will be of form:

$$length=\theta_n,$$

where $\theta_n$ represents the resultant angle after n iterations.

Calculation of the length of the resultant vector is a useful method for diagnostics purpose. It may be used for example for checking validity of the angle calculations. For an accelerometer that is in rest, i.e. not subject to any other acceleration than the gravitation force, the length of the resultant vector should be equal to acceleration caused by gravity, i.e. the set value of one_g for each axis. If this is not the case, there is some error in the CORDIC calculations, which may be caused for example by inadequate corrections made for offset, sensitivity and/or alignment.

Figure 8:
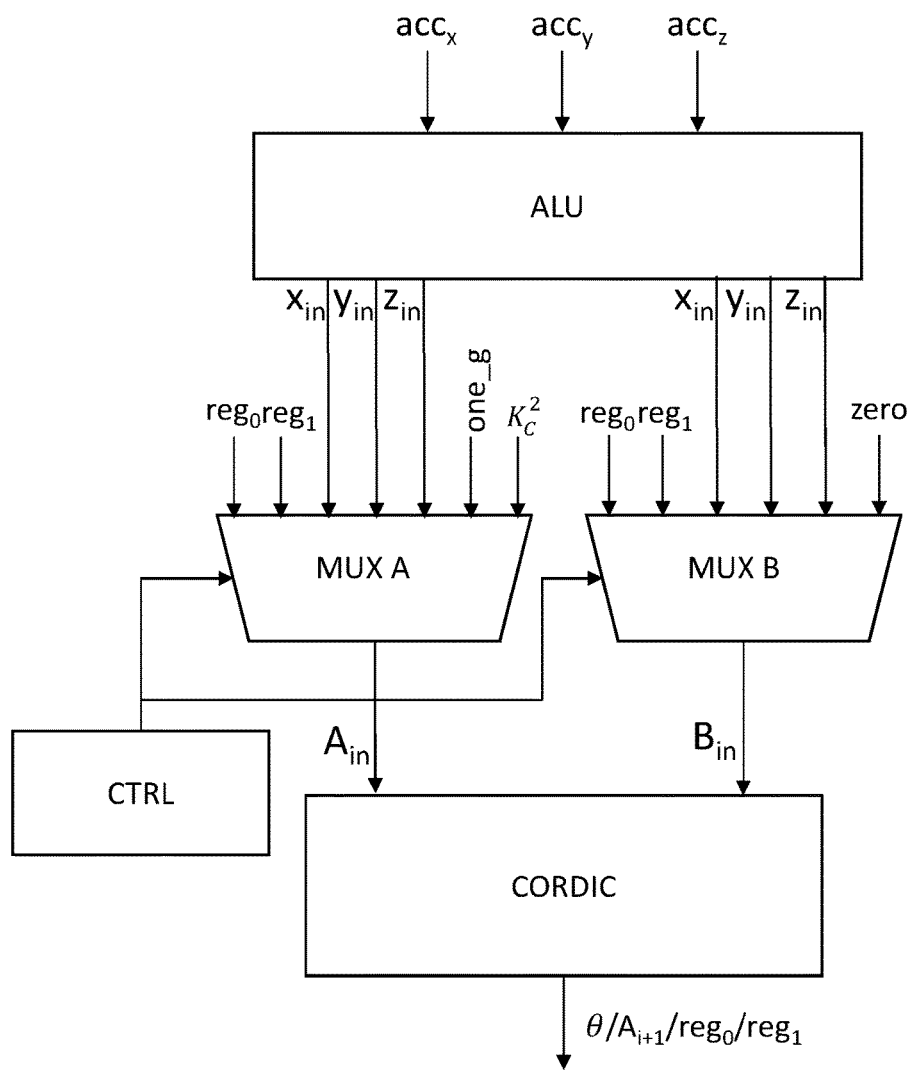
FIG. 8 shows a high level schematic view of the data path including an exemplary CORDIC unit.

FIG. 8 shows a high level schematic view of the data path including an exemplary CORDIC unit (CORDIC) configured to work with an accelerometer sensor device (not shown) capable of detecting acceleration along three different and preferably but not necessarily orthogonal axes. Input from the sensor device received over an electrical interface in form of electrical detection signals ($acc_x$, $acc_y$, $acc_z$) corresponding to the vector components of the total acceleration detected by the accelerometer device along the three different detection axes. The incoming detection signals ($acc_x$, $acc_y$, $acc_z$) can be corrected for achieving higher accuracy with an Arithmetic Logic Unit (ALU), which may perform corrections on sensitivity, offset and cross axis alignment, which corrections will be described in relation to FIGS. 9 and 10, so that the CORDIC unit (CORDIC) receives corrected detection signals ($x_{in}$, $y_{in}$, $z_{in}$) in its inputs. Multiplexers (MUXA, MUX B) are used for making selection on input signals ($A_{in}$, $B_{in}$) that are to be fed into the CORDIC unit (CORDIC). The multiplexers (MUX A, MUX B) are controlled by a controller (CTRL), which may comprise for example a state machine or a sequencer. This controller (CTRL) controls the selection of input signals ($A_{in}$, $B_{in}$) by the multiplexers (MUX A, MUX B) into the CORDIC unit (CORDIC). Possible input signals ($A_{in}$, $B_{in}$) comprise the corrected detection signals ($x_{in}$, $y_{in}$, $z_{in}$), results of previous calculation phases available in feedback registers ($reg_0$, $reg_1$) and preset reference values (zero, one_g, $K_C^2$). Selections of the input signals ($A_{in}$, $B_{in}$) to the CORDIC calculation unit (CORDIC) depend on the next CORDIC calculation phase to be performed by the CORDIC unit (CORDIC).

The CORDIC unit (CORDIC) performs the calculation operations and as a result, output is received which may represent an angle (θ), an intermediate result of an iteration round ($A_{i+1}$) or an intermediate calculation phase result from a finalized CORDIC calculation phase, after the preset number of n iterations, for storing into a feedback register ($reg_0$, $reg_1$).

Figure 9:
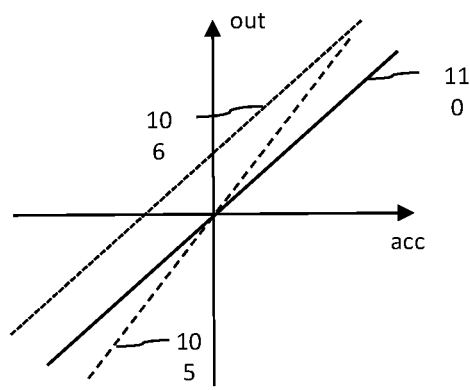
FIG. 9 illustrates exemplary response functions of an accelerometer.
Figure 10:
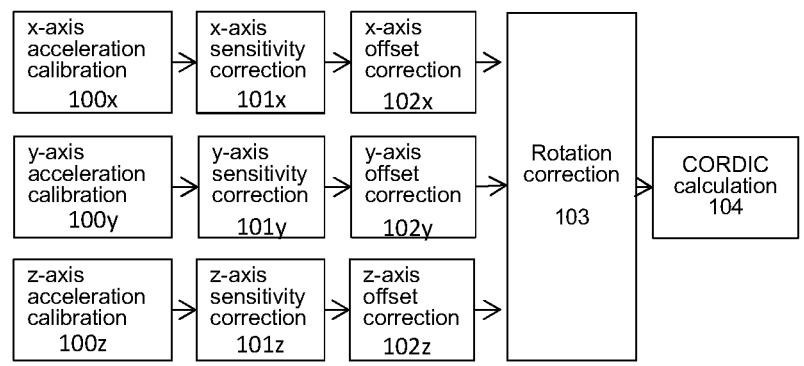
FIG. 10 illustrates correction of acceleration detection signals.

FIGS. 9 and 10 illustrate compensation of non-idealities in case of a three axis accelerometer.

FIG. 9 illustrates an exemplary response functions of an accelerometer. Detected acceleration is illustrated on the horizontal axis (acc), while the output of the accelerometer is illustrated on the vertical axis (out). An intended linear response function (110) is presented with a line having a 45° slope with respect to both axes (acc, out). Error of sensitivity is illustrated with dashed line (105), having a slope that differs from the intended response function (110) slope. Other type of error in sensitivity could be that the sensitivity would change over the scale, in other words, the response function would not be a straight line, but a curve. Error in offset is illustrated with dotted line (106) which is not crossing the axes in the origin. Such offset error would mean that the sensor output would show a non-zero value even if the acceleration was zero.

Due to the non-linear characteristic of the circular and hyperbolic CORDIC calculation operations in the CORDIC unit, compensations of non-idealities shall be performed before CORDIC calculation is performed. This is because after a non-linear operation, it would not be possible to correct the error caused in the result due to the errors input with reasonable effort.

Two main phases may be recognized for the non-ideality compensation: calibration and correction. Calibration refers to calibration or correction performed as part of manufacturing process of the device marked with phases 100*x*, 100*y*, 100*z*. Calibration is performed for each applicable axis. After installation and/or during use of the device, both sensitivity correction (101*x*, 10*y*, 101*z*) and offset correction (102*x*, 102*y*, 102*z*) is provided for each applicable axis—in this example for x, y and z-axis. Further, a rotation matrix is provided in rotation correction (103) for further correcting of the directions of the acceleration axes. The corrections (101*x*, 101*y*, 101*z*, 102*x*, 102*y*, 102*z*, 103) may be used to compensate for example errors caused by manufacturing and/or installation process or drifting of the measured acceleration values caused over time.

In the exemplary embodiment presented in FIG. 10, an initial acceleration calibration (100*x*, 100*y*, 100*z*) is performed first for each detection axis. This acceleration calibration refers to a calibration performed for the product as part of the manufacturing process. Acceleration calibration (100*x*, 100*y*, 100*z*) includes at least calibrating sensitivity and offset of the device.

Sensitivity calibration means that the device is initially calibrated so that the sensitivity of the device, i.e. the slope of the linear output response versus the detected acceleration is calibrated along each relevant axis so that the response is directly proportional to the amount of acceleration in the direction of each respective axis. Calibrating offset means that the output value provided by the accelerometer device is calibrated so that the output shows zero value at zero acceleration on each applicable measurement axis. Acceleration calibration (100*x*, 100*y*, 100*z*) may be performed simultaneously for all axes, or it may be performed one axis at a time. Acceleration calibration values may be stored in a memory and same stored acceleration calibration values may be used for subsequently, so that adjustment of acceleration calibration values may be performed just once. Acceleration calibration (100*x*, 100*y*, 100*z*) may be part of the manufacturing process so that in practice it is typically only performed once for each device.

Although the accelerometer is now appropriately acceleration calibrated (100*x*, 100*y*, 100*z*) during the manufacturing process, the calibration may not last throughout the lifetime of the device. For example, when a semiconductor device is installed by soldering, it experiences typically a high temperature shock during a soldering process, which may cause changes in the performance of the device. Another example of cause of need for further adjusting the operational settings of the device is that the device may be installed in a position which is not fully aligned with the originally calibrated axes. Further, aging may cause deviation of the operational status from the original calibration. A person familiar with the art even knows further reasons causing need for correcting the operation of an accelerometer.

In order to set the operation state of an accelerometer to the desired accuracy, further correction may be needed for operation settings. Sensitivity, offset and axis rotation may be corrected.

As described above, sensitivity refers to the amount of displacement caused by external acceleration and thus to the output signal from the sensor device caused by a detected amount of acceleration. Adjusting sensitivity refers to setting the slope of the preferably essentially linear response function of the device to a wanted value. Device sensitivity may be corrected for each axis separately. Sensitivity correction (101*x*, 101*y*, 101*z*) may be performed either manually by a user or automatically. For a multi-axis sensor device having more than one detection axis, sensitivity may be corrected simultaneously for at least two axes, or sensitivity correction (101*x*, 101*y*, 101*z*) may be performed to each axis one by one, at different times.

Correcting offset means setting the detected output value to show zero when the detected acceleration along the respective axis is zero. Offset may be corrected for each axis separately. Offset correction may be performed either manually by a user or automatically. For a multi-axis sensor device having more than one detection axis, offset may be corrected (102*x*, 102*y*, 102*z*) simultaneously for at least two axis, or offset correction (102*x*, 102*y*, 102*z*) may be performed to each axis one by one, at different times.

It should be noted that although FIG. 10 shows the sensitivity correction (101x, 101y, 101z) and offset correction (102x, 102y, 102z) in a particular order, these correction phases may be performed in any order without departing from the scope.

When all applicable axes have been scaled by the initial acceleration calibration (100x, 100y, 100z), and later sensitivity and offset corrections (101x, 101y, 101z, 102x, 102y, 102z) as described above, rotation of the axes may be adjusted in rotation correction (103) using a rotation matrix. Rotation correction (103) of the axes with the rotation matrix means that the orientation of the coordinates defined by the axes is aligned with the environment. By rotating the axes with the rotation matrix it can be ensured that the device measures acceleration along axes that are aligned exactly as intended, even if there would be some misalignment initially caused for example by errors in installation, or some long term drift caused to the alignment. If for some reason the detection axes of the sensor device would not initially be fully orthogonal with each other, the rotation matrix may even be used for correcting relative alignment of the axes, so that they become fully orthogonal. Use of rotation matrix for correcting the alignment of the axes is known to a person skilled in the art.

After the output detection signals ($acc_x$, $acc_y$, $acc_z$) of the accelerometer are fully scaled, corrected and aligned into corrected detection signals ($x_{in}$, $y_{in}$, $z_{in}$), these are ready to be used for detecting alignment, and the CORDIC unit may be used for calculation of the angle values. While the circular and hyperbolic CORDIC methods for calculating angles are not a linear methods, it is necessary to make any needed corrections to sensitivity, offset and/or alignment of axes prior to calculation of angle values. Due to the non-linearity of the circular and hyperbolic CORDIC calculation processes, any errors caused in the result due to errors in input values for the CORDIC calculation cannot be recognized and subtracted after the CORDIC (angle) calculation.

Although we have described here a three axis accelerometer, similar process may be applied to a one or two axis accelerometer. The relative order of sensitivity correction (101x, 101y, 101z) and offset correction (102x, 102y, 102z) in each direction may be performed either in parallel, or in series, one axis at a time without departing from the scope. Rotation correction (103) may preferably be performed only after all applicable axes have been sensitivity and offset corrected.

Figure 11:
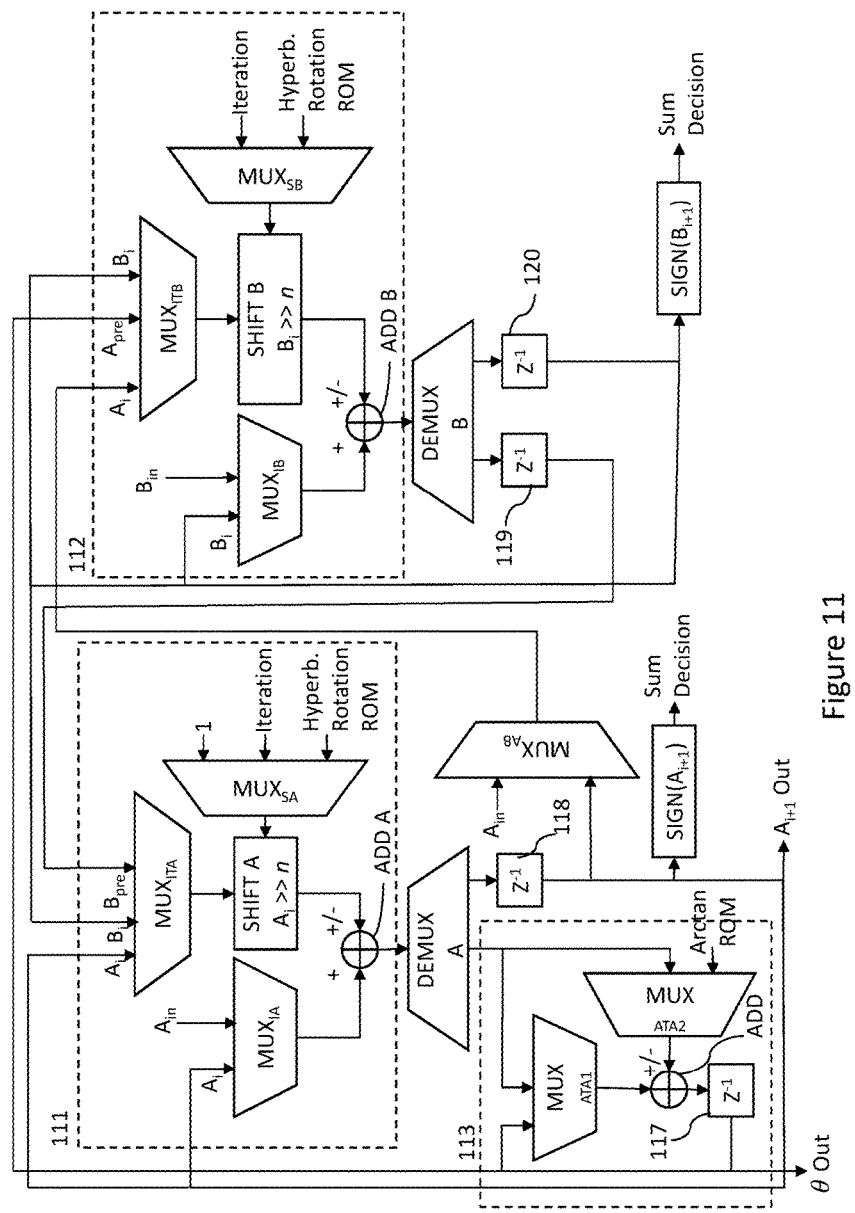
FIG. 11 represents a schematic view of an exemplary CORDIC unit for implementing calculations for a three-axis inclinometer.

FIG. 11 represents a schematic view of an exemplary CORDIC unit for implementing calculations for a three-axis inclinometer. This unit has two iteration circuitries (111, 112) in parallel, both comprising a bit shifting circuitry (SHIFT A, SHIFT B) and a summing circuitry (ADD A, ADD B) so that it is capable of performing two parallel CORDIC bit shifting and summing operations simultaneously. First multiplexers ($MUX_{IA}$, $MUX_{IB}$) are used for selecting appropriate inputs for the summing circuitries (ADD A, ADD B) so that when a new iteration round is initiated, these inputs correspond to the input signals ($A_{in}$, $B_{in}$), and during iteration rounds the signal to be summed is the previous intermediate result ($A_i$, $B_i$). Different calculation modes are implemented by feeding the input signals or intermediate results ($A_{in}$, $B_{in}$; $A_i$, $B_i$) to the respective summing circuitries (ADD A, ADDB) from CORDIC unit input ports and controlling the shifting operations performed in the respective bit shifting circuitries (SHIFT A, SHIFT B) through a control input fed from second multiplexers ($MUX_{SA}$, $MUX_{SB}$). "Iteration" input is used for normal, circular CORDIC calculations, where the iteration sequence is a simple linear sequence (1, 2, 3, 4, 5, 6 . . . , n). Hyperbolic functions are controlled with an input from a hyperbolic rotation table stored for example in a ROM memory, indicated with reference "Hyperbolic rotation ROM". As described earlier, in this hyperbolic iteration some iteration steps are duplicated, and the sequence may be for example (i=1, 2, 3, 4, 4, 5, . . . ), meaning that rotations i=4, 13, 40, . . . will be repeated in order to make the hyperbolic function converge. The overall sequence for bit shifting in Hyperbolic rotation, including two pre-rotations in the sequence would start with a sequence like (i=3, 2, 1, 2, 3, 4, 4, . . . ). Value 1 is fed into adder (ADD A) from $MUX_{SA}$ in order to perform a simple division operation, such as phase 4 of the resultant length calculation as will be shown later in Table 1.

Third multiplexers ($MUX_{ITA}$, $MUX_{ITB}$) are used to control the selection of the signal that is input to the respective bit shifting circuitries (SHIFT A, SHIFT B) for bit shifting operation. Depending on the calculation operation, this signal may be one of the result of previous iteration ($A_i$, $B_i$), temporary results of pre-rotations ($A_{pre}$, $B_{pre}$). A pre-rotation phase needs two intermediate results, namely $A_i$ and $3/4*A_i$ (or $B_i$ and $3/4*B_i$) during the same iteration round. While the pre-rotation phase does not need to accumulate angle values in the angle accumulator (117), it may temporarily be used as a register for the temporary result of pre-rotation A ($A_{pre}$) received from the first iteration circuitry (111). Another accumulator (119) is used as register for the temporary result of pre-rotation B ($B_{pre}$) from the second iteration circuitry (112). By re-using the angle accumulator (117) for this purpose, there is no need for adding another register, and therefore size of circuitry does not need to be increased for implementing the needed register for storing the temporary result of pre-rotation A ($A_{pre}$). Alternatively, a separate register may be provided, which would, however, slightly increase size of the circuitry.

The decision about whether the next intermediate iteration value ($A_{i+1}$, $B_{i+1}$) will be summed or subtracted is made based on the sign given by the respective sign defining circuitry ($SIGN(A_{i+1})$, $SIGN(B_{i+1})$). Sign defining circuitries ($SIGN(A_{i+1})$, $SIGN(B_{i+1})$) detect sign of the result obtained from the previous iteration round in order to decide whether next angle value will be added or deducted.

Demultiplexers (DEMUX A, DEMUX B) are used for feeding the result values received from the respective summing circuitry (ADD A, ADD B) into different output/feedback branches. Demultiplexer DEMUX A is used to control whether the result value received from the first iteration circuitry (111) at each clock cycle is to be stored to an accumulator (118) or to an input of an arctangent circuitry (113) configured to perform arctangent calculation. Demultiplexer DEMUX B controls selection feeding the result value received from the second iteration circuitry (112) at each clock cycle in either of the two accumulators (119, 120), so that the result value is available for feeding back to the input of either of the iteration circuitries (111, 112) as needed for next iteration. Accumulator 119 is used during pre-rotations for storing the temporary result of pre-rotation B ($B_{pre}$), while accumulator 120 is used for storing intermediate value ($B_i$) during rotation operations. Multiplexer $MUX_{AB}$ is used for selecting an input signal ($A_i$) for the second iteration circuitry (112) between the original input signal ($A_{in}$) and the result of the previous iteration round ($A_i$) performed by the first iteration circuitry (111). The input signal ($A_{in}$) is used when a new calculation phase is initiated and the result of the previous iteration round ($A_i$) is used during iteration rounds.

Accumulators ($z^{-1}$) act both as intermediate storage and as delay for the calculation results. They are used for storing the result of the current iteration result ($A_{i+1}$, $B_{i+1}$) and the contents of the accumulators ($z^{-1}$) may be read as the output of the CORDIC unit ($\theta$ Out, $A_{i+1}$ Out). The contents of the accumulators may also be utilized as input for the subsequent iteration, so that the previous iteration result ($A_i$, $B_i$) stored in an accumulator ($z^{-1}$) may be selected as input for the summation (ADD A, ADD B) and/or bit shifting operations (SHIFT A, SHIFT B) on next iteration round. Results of the performed CORDIC calculation phases may be obtained either from the A-accumulator (118) or from the angle accumulator (117). These results may be the results of calculation phases that will be stored in one of the registers ($reg_0$, $reg_1$), or final results ($\theta$,length) of calculations according to the specific mode.

Arctangent circuitry (113) comprises a summing circuitry (ADD), two multiplexers ($MUX_{ATA1}$, $MUX_{ATA2}$), and the angle accumulator (117). Arctangent circuitry (113) uses a table (arctan ROM) containing present elementary angle values ($\theta_{i\_ROM}$) for calculating the sum of angles during the iteration, which is then provided as a resulting angle value ($\theta$ Out) from the accumulator (117) of the arctangent circuitry (113). The decision whether the elementary angle value ($\theta_{i\_ROM}$) is to be added or subtracted from the previous sum is controlled by the sign defining circuitry (SIGN($A_{i+1}$)). During pre-rotation, the angle accumulator (117) of the arctangent circuitry (113) may also be used for intermediate storage for temporary result of pre-rotation A ($A_{pre}$), which may be then fed as input value in the second iteration circuitry (112). When the angle accumulator (117) is utilized for storing the angle value during iteration, the current sum of angle values ($\theta_i$) will be overwritten by the next sum ($\theta_{i+1}$) in the angle accumulator (117) of the arctangent circuitry during next clock period.

CORDIC calculation typically requires multiple iteration rounds. Thus, applicability of CORDIC method in a particular application requires that there is sufficient time to perform the needed calculations. In inclinometer use, timing is typically not a limiting factor: an accelerometer device provides samples at relatively long intervals when compared to clock frequency used for example in an ASIC circuitry performing CORDIC calculations.

Number of iteration rounds used for each calculation mode may be selected based on the type of angle calculation. In an exemplary embodiment, 16 iterations are performed for a normal angle calculation (arc tan), and 20 iterations are performed for hyperbolic function calculation (sin h). Calculation of the resultant vector length requires 2 to 4 additional operation phases after angle calculation, depending on the mode.

Table 1 below summarizes the phases for different modes of operation of the CORDIC unit. It can be noted that in three axes mode, three calculation phases are needed to complete the angle calculations in the CORDIC unit. With the term phase we refer to a calculation of an intermediate result or a final output value, the calculation comprising an iteration sequence of a predefined number of elementary rotations performed by the CORDIC unit. Each iteration step requires a period of time corresponding to one clock cycle. The same sequence of calculation phases for a calculation mode may be repeated for each different axis of calculation, always starting from a selection and order of input values suitable for the specific calculation mode and axis. For example, if three axes are used for calculations as in the exemplary CORDIC unit, the sequence of calculation phases may be repeated three times in order to receive results for each one of the three axes.

In two axes mode just one calculation phase is needed to complete the angle calculation, as the result may be directly obtained with arctangent calculation. In one axis mode, three calculation phases are needed to complete the angle calculations. For resultant vector length calculations, four calculation phases are needed to achieve the intended result. Is should be noticed that order of performance of some of the calculation phases may be changed without changing the result of the calculations. Such alternative orders will be mentioned later in the description.

| Mode | Phase 1 | Phase 2 | Phase 3 | Phase 4 |
| --- | --- | --- | --- | --- |
| $\theta = \arctan\dfrac{x}{\sqrt{y^2+z^2}}$ | $reg_0 = K_c \cdot x_{in}$ | $reg_1 = K_c \cdot \sqrt{y_{in}^2 + z_{in}^2}$ | $\theta = \arctan\dfrac{reg_0}{reg_1}$ | |
| $\theta = \arctan\dfrac{x}{y}$ | $\theta = \arctan\dfrac{x_{in}}{y_{in}}$ | | | |
| $\theta = \arcsin\dfrac{x}{one\_g}$ | $reg_0 = K_H \cdot x_{in}$ | $reg_1 = K_H \cdot \sqrt{one\_g_{in}^2 - x_{in}^2}$ | $\theta = \arctan\dfrac{reg_0}{reg_1}$ | |
| $len = \sqrt{x^2 + y^2 + z^2}$ | $reg_0 = K_C \cdot x_{in}$ | $reg_1 = K_C \cdot \sqrt{y_{in}^2 + z_{in}^2}$ | $reg_0 = K_C \cdot \sqrt{reg_0^2 + reg_1^2}$ | $\theta = \dfrac{reg_0}{K_C^2 \cdot scale}$ |

All operations described above may be implemented with a 25-bit CORDIC unit, such as the one described in connection to FIGS. 8 and 11.

In the three axis mode represented by $$\theta = \arctan\dfrac{x}{\sqrt{y^2+z^2}}$$

mode in the presented table 1, angle $\theta$ is calculated with respect to three coordinate axes. Phase 1 provides a first intermediate calculation phase result corresponding to a projection of the vector in x-axis direction times the multiplier ($K_C$) representing the change of the length of the resultant vector. This value is stored in a first register ($reg_0$) for subsequent use. Phase 2 provides a second intermediate calculation phase result corresponding to a projection of the vector in yz-plane, i.e. the plane defined by the y- and z-axes, also multiplied with the multiplier ($K_C$) representing the change of the length of the resultant vector. As long as the number of iterations is equal in phase 1 and phase 2, these multipliers ($K_C$) are equal. The second intermediate calculation phase result is stored in a second register ($reg_1$) for subsequent use. While the used CORDIC calculation algorithm and the number of iterations are the same, the values of the multipliers ($K_C$) received from Phase 1 and Phase 2 are equal, and will thus cancel each other in division operation. It should also be noticed that the order of performing Phase 1 and Phase 2 may be changed, as these two calculation phases are independent of each other. In phase 3, the resulting angle θ is calculated using the first and second intermediate calculation phase results stored in registers ($reg_0$, $reg_1$) as input values for the CORDIC arctangent calculation phase performed mainly in the arctangent circuitry (113). It can be noticed that the multipliers ($K_C$) now have become cancelled in the division operation in phase 3, and the arctangent function gives the actual value of the detected angle (θ).

In the two axis mode represented by $$\theta = \arctan\frac{x}{y}$$

in the presented table, angle θ is calculated with respect to two coordinate axes. This is the simplest mode in view of CORDIC calculation: just a single phase of calculations is needed for each direction with respect to a plane formed by two axes. The corrected pair of input values ($x_{in}$, $y_{in}$; $y_{in}$, $z_{in}$; $x_{in}$, $z_{in}$) are used as input for calculation, and after the set number of iteration rounds, the result is provided as output from the CORDIC unit.

In the one axis mode represented by $$\theta = \arcsin\frac{x}{one\_g}$$

in the presented table, angle θ is calculated with respect to reference value one_g, corresponding to situation where the device is in rest so that only gravity affects it. Instead of one_g reference values, any other reference values could be programmed as a reference values for each axis. Preferably, the reference value for an axis corresponds to length of a component of the same reference vector along the respective axis. Phase 1 provides a first intermediate calculation phase result for length of a projection of the vector in x-axis (or any chosen reference axis) direction times a multiplier ($K_H$) representing the change of the length of the vector in this hyperbolic CORDIC calculation. The first intermediate calculation phase result from the phase 1 hyperbolic CORDIC calculation is stored in a first register ($reg_0$) for subsequent use. Phase 2 provides a second intermediate calculation phase result representing length of the component of the vector orthogonal with the x-axis (or any chosen reference axis) multiplied with the multiplier ($K_H$) representing the change of the length of the vector in this hyperbolic CORDIC calculation. This second intermediate calculation phase result of this second hyperbolic CORDIC calculation is stored in a second register ($reg_1$) for subsequent use. While the used CORDIC calculation algorithm and the number of iterations are the same for both phases, the values of the multipliers ($K_H$) received in Phase 1 and Phase 2 are equal. It should also be noticed that the order of performing Phase 1 and Phase 2 may be changed, as these two calculation phases are independent of each other. In phase 3, the resulting angle (θ), corresponding to the angle between the vector and the calculated axis orthogonal to the x-axis (or any other chosen reference axis) is calculated using the first and the second intermediate calculation phase results stored in first and second registers ($reg_0$, $reg_1$) during phase 1 and phase 2 as input values for the normal circular arctangent CORDIC calculation. It can be noticed that the multipliers ($K_H$) now become cancelled in the division operation in phase 3, and the final result is the actual angle value (θ). When all sides of the triangle of the vectors of the right triangle are now known, as well as two angles (one of which is a right angle), the third angle is also known.

The fourth mode represents calculation of length of the resultant vector according to $len=\sqrt{x^2+y^2+z^2}$. This calculation requires a total of four phases to be completed. Phase 1 provides a first intermediate calculation phase result for projection of the vector in x-axis direction times the multiplier ($K_C$) representing the change of the length of the resultant vector. This first intermediate calculation phase result is stored in a first register ($reg_0$) for subsequent use. Phase 2 provides a second intermediate calculation phase result for projection of the vector in yz-plane, i.e. the plane defined by the y- and z-axes, also multiplied with the multiplier representing the change of the length of the resultant vector ($K_C$). This second intermediate calculation phase result is stored in a second register ($reg_1$) for subsequent use. While the used CORDIC calculation algorithm and the number of iterations are the same, the values of the multipliers ($K_C$) received in Phase 1 and Phase 2 are equal. It should also be noticed that the order of performing Phase 1 and Phase 2 may be changed, as these two calculation phases are independent of each other. In Phase 3, a third intermediate calculation phase result is calculated representing the total length of the vector multiplied with another instance of the same multiplier ($K_C$). The third intermediate calculation phase result in phase 3 may be written in the first register ($reg_0$) which was earlier used for storing the first intermediate calculation phase result received from Phase 1, since the old result is not needed any more. In the final phase, the third intermediate calculation phase result stored in the first register ($reg_0$) and second intermediate calculation phase result stored in the second register ($reg_1$) are used for calculating the final result, corresponding to the length of the resultant vector. In an alternative embodiment, a separate register may be provided for the third intermediate calculation phase result, with cost of need for a register, which increases slightly the total size of the circuitry. The calculation of length of the resultant vector may be used for instance for error detection in the system. When the length of the resultant vector is calculated for a device that is not moving nor tilted in any way, the length of the resultant vector should be equal to the one_g reference. If the length of the resultant vector would deviate from this value, error has occurred during the process, either in the calculations, in the detection element or in calibration and/or correction in the ALU unit.

The user of the device may choose the mode(s) that are calculated for each set of samples. In a typical application, just one mode for calculations is selected, and the corresponding phases are executed in order to calculate the intended result values for each relevant axis one by one. However, the system does not limit the amount of result values (angle, length) calculated. If time allows, the system may be used to calculate all possible result values available or a selection of result values from more than one mode.

In any mode, calculation may be performed one phase at a time for all relevant axes, or the whole calculation process may be first completed for one axis before initiating calculations for the next axis. Calculating results for one axis and one mode at a time allows minimizing the amount of needed storage for intermediate calculation phase results, thus optimizing the size of the circuitry.

An example of how total time required for the calculations required to perform calculation of angle values for three different axes one by one in the exemplary CORDIC unit may be illustrated with simple calculation. Let's assume we wish to obtain results for all three axes in $$\theta = \arcsin\frac{x}{one\_g}$$

mode. With one CORDIC unit implementation as described in FIGS. 8 and 11, each of the 3 different directions $$\left(\theta_x = \arcsin\frac{x}{one\_g}, \theta_y = \arcsin\frac{y}{one\_g}, \theta_z = \arcsin\frac{z}{one\_g}\right)$$

are calculated separately, and each calculation requires 3 phases. If each of the three phases would be chosen to be done with 20 iterations, total time required to perform the calculations would be 3*3*20=180 clock cycles. If the number of iterations would be defined to be less than 20 for the final arctangent calculation phase, for example 16 iterations, the calculation would require a total of 3*(2*20+16) =168 clock cycles.

In angle calculations with a CORDIC unit described in FIGS. 8 and 11, by using 16 iterations for normal arctangent angle calculations and 20 iterations for hyperbolic function calculations, an error margin of less than 0.01° is achieved. Including the calculation of the resultant vector length in the same CORDIC unit will increase the size of the device only with circuitry required to perform the final division phase, namely multiplexers $MUX_{ATA2}$ ja $MUX_{AB}$, and a couple of additional inputs ($A_{pre}$, $B_{pre}$) to existing multiplexers to facilitate the pre-rotation operation.

Figure 13:
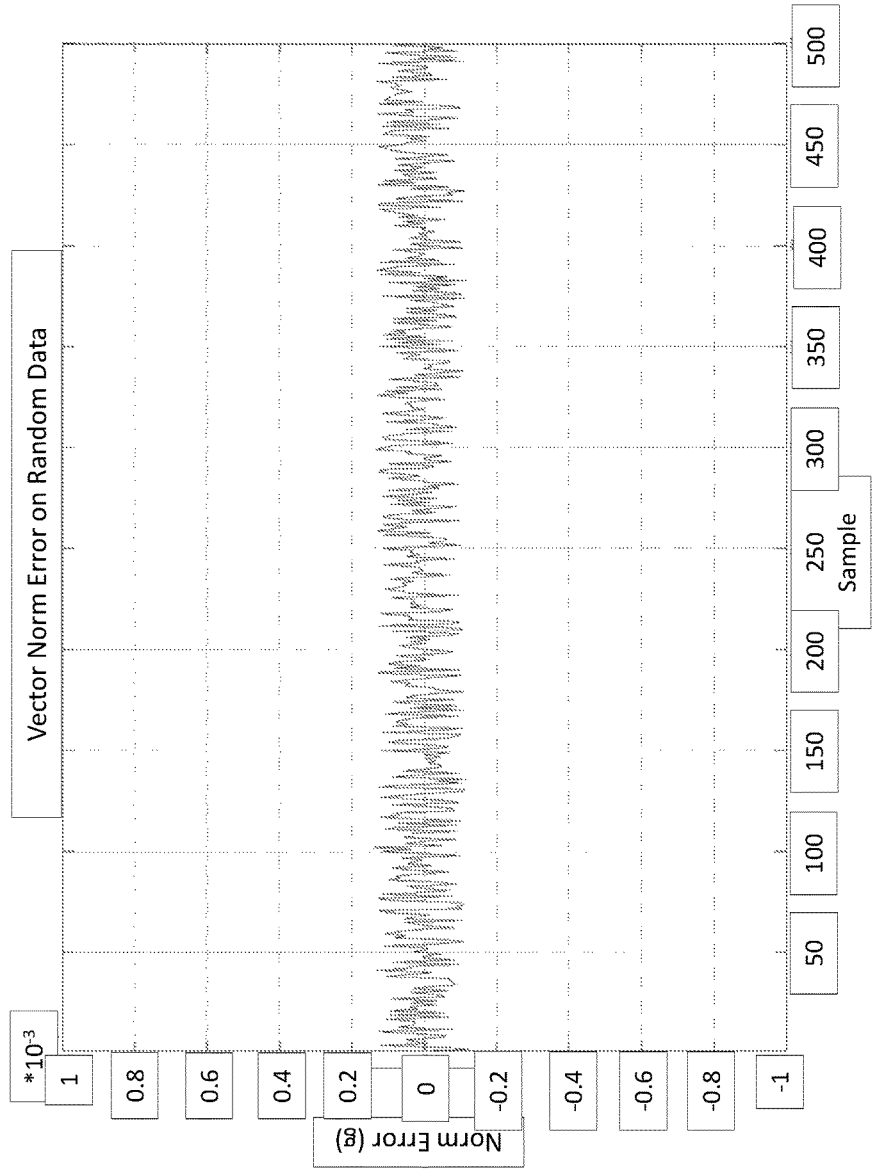
FIG. 13 illustrates angle errors caused by different arcsine CORDIC implementations.

FIG. 13 illustrates angle errors caused by different arcsine CORDIC implementations. Thin line (131) presents result of a simple arcsine calculation using CORDIC without corrections. Although this thin line (131) mostly follow the zero error line accurately, it can be noticed that even rather large error spikes in varying directions with magnitude order of 5 degrees appear along the scale, and when the angle is more than about ±80°, the error becomes even larger. Thus, simple arcsine calculation like this is not feasible for accurate acceleration devices. Dashed line (132) illustrates error of a double iterations arcsine calculation with a prior art CORDIC unit. In this calculation, the number of spikes have been reduced, but the simulation shows significant error with large resultant angles. The resulting hyperbolic arcsine function calculated according to the current invention, using two pre-rotations, is marked with a thick, solid line. It may be noticed that this function provides very linear result up to about ±88° angles, which is sufficient for the intended use of the CORDIC unit with an accelerometer for implementing an inclinometer. It should be noticed, that if the angle of the resultant vector is known to be relatively small, hyperbolic function may be simplified so that it is calculated without pre-rotations, or with just a single pre-rotation. On the other hand, if angles close to 90° should be reliably detected, more than two pre-rotations may be used, thus expanding the convergence condition of the calculation function closer to 90°.

Figure 12:
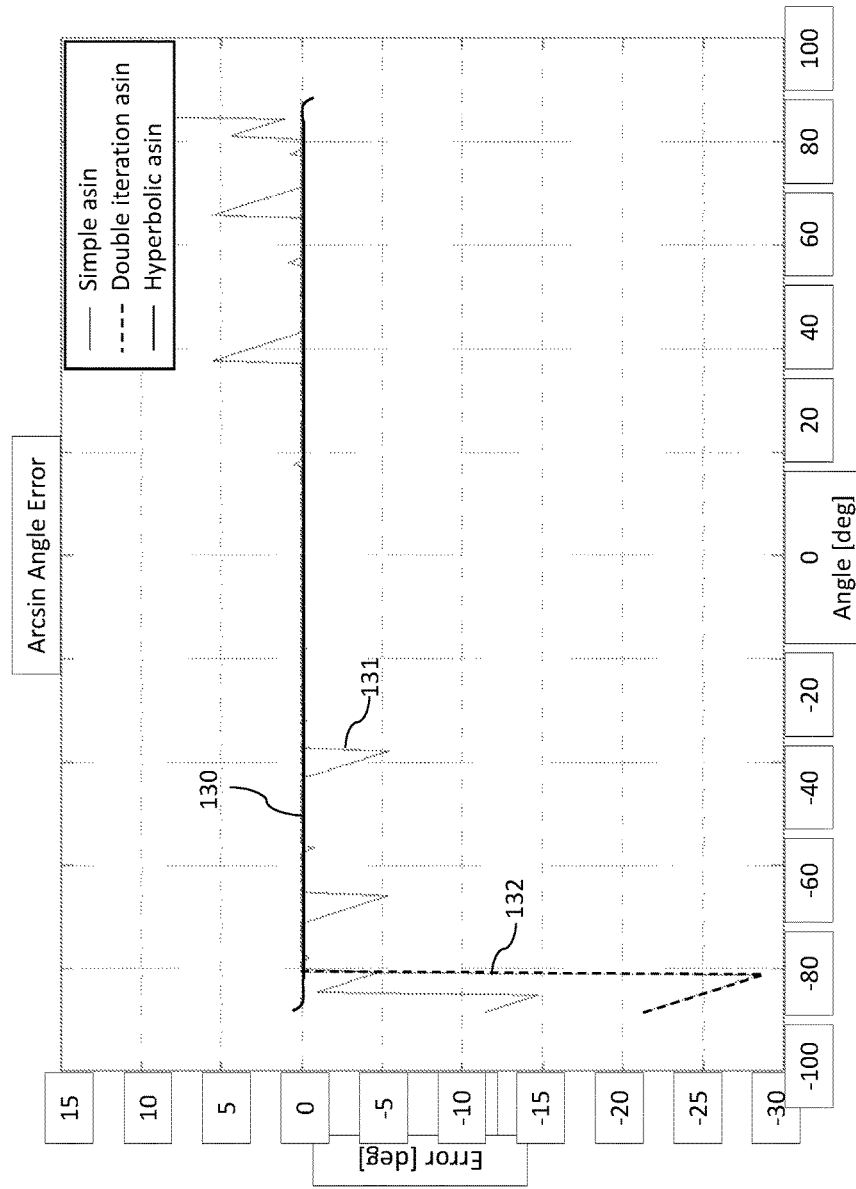
FIG. 12 illustrates error of the length of the resultant vector compared to the vector norm of 1 g.

FIG. 12 illustrates error of the length of the resultant vector compared to the norm of one_g with calculation performed with the method as described above. With the exemplary 25 bit CORDIC unit, the resultant vector length may be calculated with error margin that is less than 0.0002*one_g, i.e. less than 0.02%.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A digital circuitry configured to perform calculations for an inclinometer device, the circuitry comprising:
   an interface configured to receive detection signals from a sensor device; and
   a CORDIC unit configured to perform calculations of inclinometer output values characterizing a resultant vector,
   wherein the CORDIC unit is configured to perform a first calculation for resolving an angle between a resultant vector representing the detection signals and a programmable reference value, the first calculation including at least two hyperbolic CORDIC calculation phases,
   wherein the first calculation comprises:
      determining a first intermediate result corresponding to a length of a projection of the resultant vector on a reference axis times a multiplier representing the change of the length of the vector by using a hyperbolic CORDIC arctangent function;
      determining a second intermediate result corresponding to a length of a component of the resultant vector orthogonal with a reference axis multiplied with a multiplier representing a change of the length of the vector using the hyperbolic CORDIC arctangent function; and
      determining an angle between the resultant vector and a calculated axis orthogonal to the reference axis based on the first and the second intermediate results using a circular CORDIC arctangent function.

2. The digital circuitry according to claim 1, wherein the programmable reference value corresponds to an effect of normal gravity along a defined reference axis.

3. The digital circuitry according to claim 1, wherein the result of the first calculation equals to an angle calculated with an arcsine function between the resultant vector and the reference value, and wherein the circuitry is configured to perform at least one pre-rotation prior to performing any one of the hyperbolic CORDIC arctangent calculations in order to expand a convergence condition of the resulting arcsine function.

4. The digital circuitry according to claim 1, wherein the CORDIC calculation unit is further configured to perform at least one of:
   a second calculation for resolving an angle between a resultant vector or a projection of the resultant vector and an axis in a plane defined by two axes, the second calculation including one circular CORDIC calculation phase;
   a third calculation for resolving an angle between a resultant vector and a plane defined by two detection axes, the third calculation utilizing at least two circular CORDIC calculation phases; and
   a fourth calculation for resolving a length of the resultant vector, the fourth calculation including at least two circular CORDIC calculation phases.

5. The digital circuitry according to claim 1, wherein each of the CORDIC calculations is configured to make a decision on a sign of a subsequent summing operation by comparing a value of a current resultant vector to a zero value.

6. The digital circuitry according to claim 1, wherein each CORDIC calculation is configured to perform two bit shifting operations per CORDIC iteration round.

7. The digital circuitry according to claim 1, wherein the detection signals comprise signals corresponding to acceleration detected along three mutually orthogonal axes, and the CORDIC calculation unit is configured to perform similar calculations using detection signals of any one, two or three of the three axes.

8. The digital circuitry according to claim 1, wherein the digital circuitry further comprises an Arithmetic Logic Unit (ALU) configured to correct sensitivity, offset and rotation of the detection signals, in order to provide corrected detection signals as input for the CORDIC unit.

9. The digital circuitry according to claim 1, wherein the sensor device comprises a MEMS accelerometer.

10. A method for performing calculations for an inclinometer device, the method performed based on detection signals received from a sensor device and the method comprising calculations of inclinometer output values characterizing a resultant vector, wherein the calculations are performed by a CORDIC unit, the method comprising:
  performing a first calculation for resolving an angle between a resultant vector representing the detection signals and a programmable reference value, the first calculation including at least two hyperbolic CORDIC calculation phases,
  wherein performing first calculation comprises:
  determining a first intermediate result corresponding to a length of a projection of the vector on a reference axis times a multiplier representing the change of the length of the vector by using a hyperbolic CORDIC arctangent function;
  determining a second intermediate result corresponding to a length of the component of the vector orthogonal with the reference axis multiplied with the multiplier representing the change of the length of the vector using a hyperbolic CORDIC arctangent function; and
  determining an angle between the resultant vector and a calculated axis orthogonal to the reference axis based on the first and the second intermediate results using a circular CORDIC arctangent function.

11. The method according to claim 10, wherein the programmable reference value corresponds to effect of normal gravity along a defined reference axis.

12. The method according to claim 10, wherein a result of the first calculation equals to an angle calculated with an arcsine function between the resultant vector and the programmable reference value, and prior to performing any one of the hyperbolic CORDIC arctangent calculations, the method further comprising:
  performing at least one pre-rotation for the resultant vector in order to expand a convergence condition of a resulting arcsine function.

13. The method according to claim 10, wherein the method further comprises any one of:
  performing a second calculation for resolving an angle between a resultant vector or a projection of the resultant vector and an axis in a plane defined by two axes, the second calculation including one circular CORDIC calculation phase;
  performing a third calculation for resolving an angle between a resultant vector and a plane defined by two detection axes, the third calculation utilizing at least two circular CORDIC calculation phases; and
  performing a fourth calculation for resolving the length of the resultant vector, the fourth calculation including at least two circular CORDIC calculation phases.

14. The method according to claim 10, wherein each of the CORDIC calculations is configured to make a decision on a sign of a subsequent summing operation by comparing a value of a current resultant vector to a zero value.

15. The method according to claim 10, wherein each of the CORDIC calculations is configured to perform two bit shifting operations per CORDIC iteration round.

16. A method according to claim 10, wherein the detection signals comprise signals corresponding to acceleration detected along three mutually orthogonal axes, and wherein the CORDIC calculation unit is configured to perform similar calculations using detection signals of any one, two or three of the three axes.

17. A method according to claim 10, wherein the method further comprises steps of correcting sensitivity, offset and rotation of the detection signals, the steps of correcting performed by an Arithmetic Logic Unit (ALU), in order to provide corrected detection signals as input for the CORDIC unit.

18. A method according to claim 10, wherein the sensor device comprises a MEMS accelerometer.

* * * * *